[95.]
M. P. HAYES.
Improvement in Evaporaters for Brine.
No. 118,718.        Patented Sep. 5, 1871.
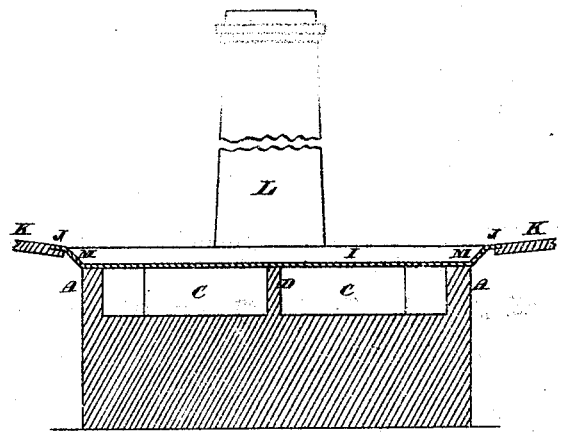
Fig. 2.
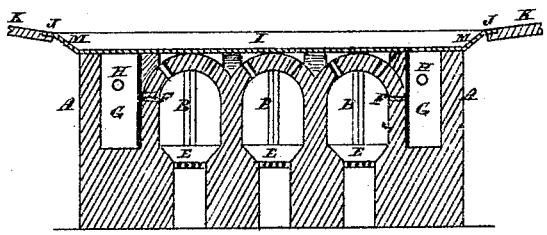
Fig. 3.
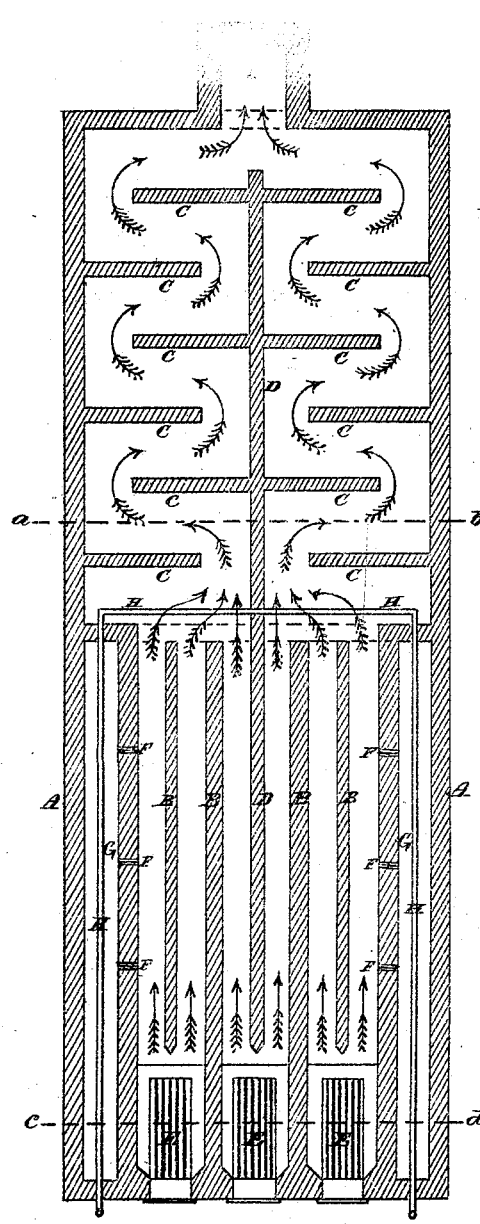
Fig. 1. Plan
Witnesses.
M. P. Hayes,
Inventor.

118,718

UNITED STATES PATENT OFFICE.

MARTIN PETER HAYES, OF SEAFORTH, CANADA.

IMPROVEMENT IN EVAPORATORS FOR BRINE.

Specification forming part of Letters Patent No. 118,718, dated September 5, 1871.

*To all whom it may concern:*

Be it known that I, MARTIN PETER HAYES, of Seaforth, in the county of Huron, in the Province of Ontario and Dominion of Canada, have invented certain Improvements in Brine-Evaporators, of which the following is a specification.

The first part of my invention relates to constructing the furnace-block with chambers on each side internally to be heated from the furnaces, apertures being left for that purpose, to provide a uniform heat to the sides of the evaporating-pan, thereby preventing the incrustation thereon and effecting a saving in fuel. The second part of my invention relates to heating the brine previous to its discharge into the evaporating-pan by passing it through a pipe or pipes or tubes passing through the air-chambers previously described.

Figure 1 is a plan of an apparatus embodying my invention, showing the arrangement of the flues, furnaces, and hot-air chambers. Fig. 2 is a transverse vertical section through the rear pan on the line *a b*. Fig. 3 is a transverse vertical section through the furnaces on the line *c d*.

A represents the exterior walls of the apparatus. B B are the internal walls forming straight longitudinal flues from the furnaces under the front pan, and which flues lead to other zigzag flues formed by the transverse walls C under the rear pan. A central wall, D, runs longitudinally under both pans and nearly up to the smoke-stack in rear. The furnaces E, of any required number, are arched from the front to a distance of about twenty feet to the rear. Outside the furnace-walls on both sides are hot-air chambers G, with brick or stone walls A A inclosing them. These chambers are closed at both ends, are heated by air passing through holes F in the furnace sides, and run the whole length of the first pan. They distribute a regular and uniform heat to the sides of the pan, and thus prevent incrustation of salt thereon. H is a pipe leading from the supply-tank, and which pipe, after passing longitudinally one or more times through one of the air-chambers, crosses to the opposite chamber, and, passing therein, discharges the brine in a heated state into the evaporating-pan. This pipe is provided with taps to regulate the flow to the pan. By the use and arrangement of this pipe or any number of them, substantially as described, the brine is heated to any desired temperature before it enters the pan by utilizing the heat from the furnace, and by the use of hot brine the consumption of fuel is diminished. I is an evaporating-pan, which is made in two parts or divisions, both of which rest upon and correspond in area to the exterior walls of the furnace-block. They also rest upon the division-walls of the flues. One pan is placed over the front half and the other over the rear half of the furnace-block. The sides M of these pans bevel outwardly at an angle of about fifty degrees from the bottom, which is flat. The top edge has a beveled flange, J, to which the platform-boards K are fastened. The beveling sides allow the salt to be easily drawn from the pans, and the flange prevents leakage of the brine down the outside face of the walls of the furnace-block. The course of the heated air and smoke from the furnaces to the smoke-stack L in rear is indicated by arrows.

I claim as my invention—

1. In constructing the furnace-block A with air-chambers G and openings F, substantially as and for the purpose set forth.

2. The arrangement of the pipe H and heating-chambers G, or any modification of the same, substantially as and for the purpose set forth.

M. P. HAYES.

Witnesses:
S. G. M. CAUGHEY,
H. I. I. CAMPBELL.